United States Patent
Zhang et al.

(10) Patent No.: US 11,748,218 B2
(45) Date of Patent: Sep. 5, 2023

(54) METHODS, ELECTRONIC DEVICES, STORAGE SYSTEMS, AND COMPUTER PROGRAM PRODUCTS FOR ERROR DETECTION

(71) Applicant: EMC IP Holding Company LLC, Hopkinton, MA (US)

(72) Inventors: Min Zhang, Shanghai (CN); Guifeng Tang, Shanghai (CN); Zhe Wang, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 541 days.

(21) Appl. No.: 16/846,820

(22) Filed: Apr. 13, 2020

(65) Prior Publication Data

US 2020/0241985 A1    Jul. 30, 2020

(30) Foreign Application Priority Data

Jul. 31, 2019 (CN) .......................... 201910701346.7

(51) Int. Cl.
G06F 11/22 (2006.01)
G06F 13/42 (2006.01)
G06F 13/40 (2006.01)

(52) U.S. Cl.
CPC ........ G06F 11/221 (2013.01); G06F 13/4022 (2013.01); G06F 13/4282 (2013.01); *G06F 2213/0026* (2013.01)

(58) Field of Classification Search
CPC ............... G06F 11/221; G06F 13/4022; G06F 13/4282; G06F 2213/0026

USPC .......................................................... 714/41
See application file for complete search history.

(56) References Cited

U.S. PATENT DOCUMENTS

| | | |
|---|---|---|
| 6,182,248 B1 * | 1/2001 | Armstrong ............ G06F 11/221 714/757 |
| 6,490,544 B1 | 12/2002 | Diamond et al. |
| 6,560,720 B1 | 5/2003 | Chirashnya et al. |
| 6,647,516 B1 | 11/2003 | Rust et al. |
| 6,886,116 B1 | 4/2005 | MacLellan et al. |

(Continued)

FOREIGN PATENT DOCUMENTS

| | | |
|---|---|---|
| CN | 102571498 | 7/2012 |
| CN | 103001808 | 3/2013 |

(Continued)

*Primary Examiner* — Yair Leibovich
(74) *Attorney, Agent, or Firm* — BainwoodHuang

(57) ABSTRACT

Techniques for error detection involve injecting, to a switch of a storage system, information representing an error of at least one device to be tested of the system, such that the information representing the error is passed from an upstream port of the switch to a computing device connected with the switch, the switch being connected to the at least one device to be tested via a downstream port. The techniques further involve obtaining a handling result of the computing device on the information representing the error, and determining an error handling capability of the system at least partly by analyzing the handling result. Accordingly, slave storage devices of storage system nodes, connectors, the entire PCIe topology at the CPU level, and an NVMe bus can be tested, so that the entire logical path of the error handling can be tested, thereby improving performance and saving testing costs.

20 Claims, 4 Drawing Sheets

(56) References Cited

U.S. PATENT DOCUMENTS

| | | | |
|---|---|---|---|
| 7,020,803 B2 | 3/2006 | Wolin et al. | |
| 10,255,172 B1 | 4/2019 | Kucherov et al. | |
| 2005/0125189 A1* | 6/2005 | Clegg | G06F 11/2215 |
| | | | 702/124 |
| 2007/0234118 A1* | 10/2007 | Sardella | G06F 11/0727 |
| | | | 714/E11.023 |
| 2018/0063558 A1* | 3/2018 | Stefanidis | H04N 21/26258 |
| 2020/0349040 A1* | 11/2020 | Zhang | G06F 11/0775 |

FOREIGN PATENT DOCUMENTS

| CN | 204965090 U | 1/2016 |
|---|---|---|
| CN | 106357462 | 1/2017 |

* cited by examiner

METHODS, ELECTRONIC DEVICES, STORAGE SYSTEMS, AND COMPUTER PROGRAM PRODUCTS FOR ERROR DETECTION

CROSS-REFERENCE TO RELATED APPLICATION

This application claims priority to Chinese Patent Application No. CN201910701346.7, on file at the China National Intellectual Property Administration (CNIPA), having a filing date of Jul. 31, 2019, and having "ERROR DETECTION METHODS, ELECTRONIC DEVICES, STORAGE SYSTEMS, AND COMPUTER PROGRAM PRODUCTS" as a title, the contents and teachings of which are herein incorporated by reference in their entirety.

FIELD

Embodiments of the present disclosure generally relate to the field of error injection, and more specifically, to a method, electronic device, storage system and computer program product for error detection.

BACKGROUND

In the server and storage industries, the use of the High Speed External Component Interconnect (PCIe) bus protocol is becoming more widespread, with faster bus speeds and better performance. Therefore, the stability and reliability requirements of the entire system are gradually increased. In particular, for next-generation storage products, NVMe disks that follow the Non-Volatile Memory Host Controller Interface Specification (NVMe) will be deployed, and NVMe relies on the PCIe bus, so the stability requirements of the PCIe bus in the storage industry become more prominent.

In order to make the system more robust, it is necessary to study the PCIe and NVMe error sources, the system behavior and error handling mechanism. For example, it is desirable to test the error handling capability of the storage system. This can be achieved by proactively injecting errors into the storage system and monitoring the storage system's ability to handle errors. The error-injection-based mechanism can measure whether the storage system can respond correctly when an error occurs, so that measures can be taken to repair or change the error handling capability of the system in time.

SUMMARY

The embodiments of the present disclosure provide a method, electronic device, storage system, and computer program product for error detection.

In a first aspect of the present disclosure, there is provided a method of error detection. The method includes injecting, to a switch of a storage system, information representing an error of at least one device to be tested of the storage system, such that the information representing the error is passed from an upstream port of the switch to a computing device connected with the switch, the switch being connected to the at least one device to be tested via a downstream port. The method also includes obtaining a handling result of the computing device on the information representing the error. Moreover, the method includes determining an error handling capability of the storage system at least partly by analyzing the handling result.

In a second aspect of the present disclosure, there is provided an electronic device. The electronic device includes a processor; and a memory coupled to the processor and storing instructions for execution, the instructions, when executed by the processor, causing the electronic device to perform acts. The acts include injecting, to a switch of a storage system, information representing an error of at least one device to be tested of the storage system, such that the information representing the error is passed from an upstream port of the switch to a computing device connected with the switch, the switch being connected to the at least one device to be tested via a downstream port. The acts also include obtaining a handling result of the computing device on the information representing the error. Moreover, the acts include determining an error handling capability of the storage system at least partly by analyzing the handling result.

In a third aspect of the present disclosure, there is provided a storage system. The storage system includes a computing device. The storage system also includes a switch connected to the at least one device to be tested via a downstream port, and connected to the computing device via an upstream port. The storage system further includes an electronic device in the second aspect. The electronic device is connected to the switch and injects information representing an error of the at least one device to be tested into the switch.

In a fourth aspect of the present disclosure, there is provided a computer program product tangibly stored on a non-transient computer readable medium and including machine executable instructions which cause, when executed, a device to perform the method in the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar symbols refer to the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Various example embodiments of the present disclosure will be described below with reference to the accompanying drawings. It would be appreciated that these drawings and description are provided only as example embodiments. It should be pointed out that alternative embodiments of the structure and method disclosed herein can be envisioned from the following description, and these alternative embodiments may be used without departing from principles as claimed herein.

It is to be understood that these example embodiments are discussed only for the purpose of enabling those skilled persons in the art to better understand and thus implement the present disclosure, rather than suggesting any limitations on the scope of the present disclosure.

As used herein, the term "includes", "comprises" and its variants are to be read as open-ended terms that mean "includes/comprises, but is not limited to." The term "based on" is to be read as "based at least in part on." The term "some embodiments" is to be read as "at least some embodiments"; and the term "another embodiment" is to be read as "at least one another embodiment". Relevant definitions of other terms may be included below.

Figure 1:
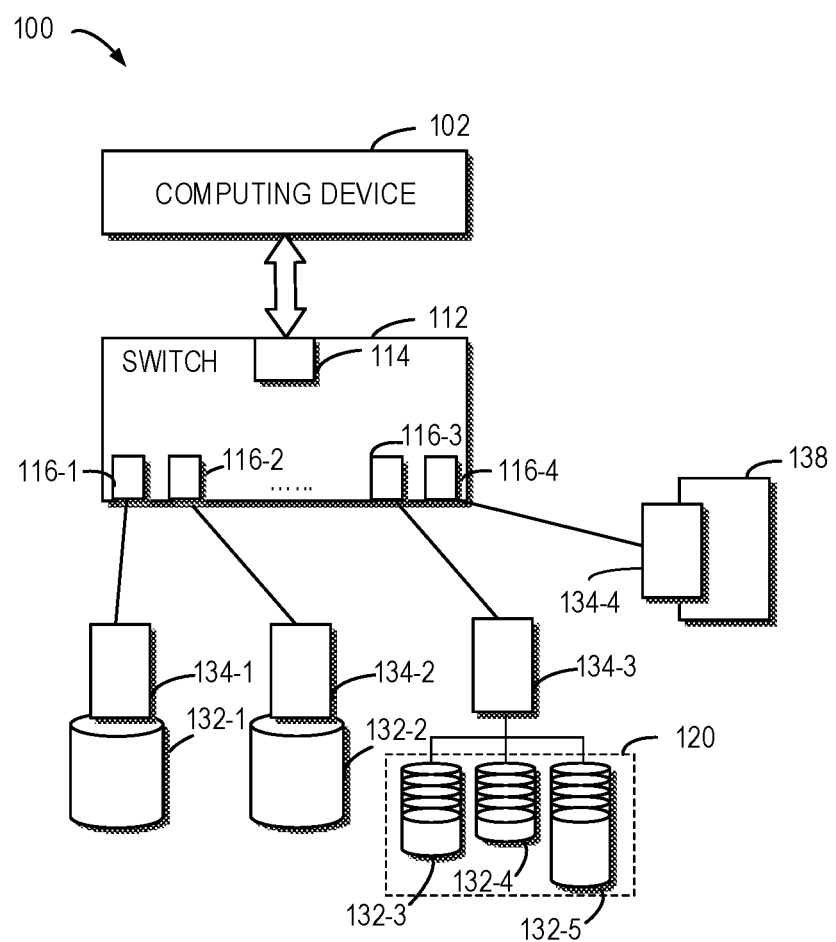
FIG. 1 illustrates a block diagram of a data storage system in which embodiments of the present disclosure can be implemented.

FIG. 1 illustrates a schematic diagram of architecture of a data storage system 100 in which embodiments of the present disclosure can be implemented. It would be appreciated that structure and function of the data storage system 100 are described for purpose of examples only without suggesting any restrictions over the scope of the present disclosure. Embodiments of the present disclosure can also be applied into the data storage system 100 having different structures and/or functions.

As shown in FIG. 1, a storage device array 130 for storing data is deployed in the data storage system 100. The storage device array 130 can include a plurality of storage devices 132-1 to 132-5 and so on. For convenience of description, the storage devices 132-1 to 132-5 are sometimes collectively or individually referred to as storage device 132. It would be appreciated that the number of storage devices shown in FIG. 1 is only by way of example without suggesting any limitation to the scope of the present disclosure.

The storage device 132 may be a non-volatile storage device or storage unit, such as Solid-State Drive (SSD), a disk, and the like. The storage device 132 can conform to an appropriate interface specification, for example, Non-Volatile Memory Host Controller Interface Specification (NVMe). The storage device 132 conforming to the NVMe may sometimes be referred to as NVMe devices or NVMe disks. The storage capacity of each storage device 132 may be of any size.

In the data storage system 100, the computing device 102 is configured to control an Input/Output (I/O) operation for the storage device 132. The computing device 102 may sometimes be referred to as storage server or host server. The computing device 102 may perform a data read/write operations for the storage device 132 responsive to requests from users or other devices and can manage data access and storage of the storage devices 132.

The respective storage devices 132 may be connected to the computing device 102 via a Just a Bunch Of Disks (JBOD) array enclosure 120. JBOD is sometimes referred to as Disk Array Enclosure (DAE). JBOD 120 is an independent array enclosure external to the computing device to support interactions between the storage devices and the computing device connected with each other. In some embodiments, JBOD 120 is an external device independent from the computing device 102, and may lack of storage management or processing functions.

The data storage system 100 includes, for example, a switch 112. The switch 112 is connected to the storage device 132 and the computing device 102. In the case, the computing device 102 may implement I/O operation control of these storage devices 132.

In the example of FIG. 1, the switch may include a plurality of downstream ports 116-1 to 116-4. The downstream ports 116-1 to 116-4 may be regarded as different types of connectors. For example, the storage device 132-1 may be connected via a switch card 134-1 to the downstream port 116-1 of the switch 112, and the downstream port 116-1, for example, may be regarded as a U.2 connector. The storage device 132-3 may be connected via a switch card 134-2 to the downstream port 116-2 of the switch 112, and the downstream port 116-2, for example, may be regarded as M.2 connector. JBOD 120 may be connected via a switch card 134-3 to the downstream port 116-3 of the switch 112, and the downstream port 116-3, for example, may be regarded as a Mini Serial Attached Small Computer System Interface High Density Interconnect (MiniSAS HD).

In addition, the switch may also include a downstream port 116-4. The downstream port 116-4, for example, may be regarded as Peripheral Component Interconnect express (PCIe) extension. The PCIe card, such as a PCIe Host Bus Adapter (PCIe HBA) 138, may be connected via a switch card 134-4 to the downstream port 116-4. For illustration, FIG. 1 only shows the example downstream ports 116-1 to 116-4 of the switch 112. However, it would be appreciated that there may be more downstream ports.

The switch 112 also includes an upstream port 114 for connecting with the computing device 102. In some embodiments, the upstream port 114, for example, may include another type of PCIe interface (also referred to as PCIe Golden Finger) different than the PCIe extension. Moreover, in some embodiments, the upstream port 114, for example, may be a U.2 connector.

In some embodiments, the storage device 132 is interconnected with the switch 112, and the interconnection therebetween may be based on a bus. When the bus is a PCIe link or PCIe bus, the switch 112 may be a PCIe switch. The PCIe switch 112 may communicate with the storage device 132 and the computing device 102 based on the PCIe protocol.

For ease of description, the downstream ports 116-1, 116-2, and the like, of the switch 112 sometimes are referred to as downstream port 116 collectively or individually. In the present disclosure, the port connecting the switch with the computing device is referred to as upstream port, and the port connecting the switch with the storage device is referred to as downstream port. "Upstream port" and "downstream port" herein do not suggest any limitation to data transmission directions. In other words, via the downstream port, the storage device may pass data to the switch, and the switch may pass data to the storage device as well. Likewise, via the upstream port, the computing device may pass data to the switch, and the switch may also pass data to the computing device. The switch performs data communication between the upstream port and the downstream port according to an internal switch structure, to forward the data to a respective destination.

In a normal operating mode of the data storage system 100, if the computing device 102 needs to perform an I/O operation on a certain storage device 132, information from the computing device 102 is provided to the upstream port of the switch 112, and forwarded to the downstream port 116 of the storage device 132 via the internal exchange structure of the switch 112 and thus passted to the storage device 132. On the opposite path, the information (for example, read data, a response to a write request, and the like) from the storage device 132 is provided to the downstream port 116 of the switch 112, and forwarded to the upstream port 114 via the internal switch structure, thus arriving at the respective computing device 102.

In the operation of the data storage system 100, an error probably occurs in the storage device 132 and the connection port thereof, the disk cluster and the connection port thereof, and the PCIe extension and the PCIe device (for example, PCIe HBA 138), which may be regarded as devices to be tested in error injection. An error at a software and/or hardware level may occur in these devices and ports. The error may bring about an error in information transmission on the I/O path of the data storage system 100, for example, generation of false information, or failure at passting the information to the destination. The computing device 102 is typically configured with a corresponding error handling capability for detecting or correcting errors occurring in the system. For example, when detecting occurrence of an error, the computing device 102 performs a respective act to correct the error, or sends an alarm if the error cannot be corrected. Since errors occurring spontaneously when running the system are unpredictable, in order to test the error handling capability of the system, information representing particular errors may be injected actively to the data storage system, and a handling result of the error information may be observed.

As aforementioned, an error handling capability of testing or detecting a storage system is desired. An error processing detection mechanism can be implemented based on error injection. Errors may occur inside the storage device or in the links of the storage device, as hardware infrastructure. Therefore, it is meaningful to test how a storage system processes errors related to the storage device. In general, storage device manufacturers do not provide a method of injecting directly errors at a storage device. In the case, when it is unable to pass information representing errors over an entire I/O path from a storage device up to a computing device, it remains unknown whether the computing device has a capability of carrying out correct measures. This brings about difficulties in detection of the error handling capability of the data storage system.

According to the embodiments of the present disclosure, there is provided a solution for storage management, to simulate errors from a storage device. In the solution, information representing an error of a device or port in the storage system may be injected in a switch and passed to a computing device. By obtaining a handling result of the computing device on the information representing the error, an error handling capability of the storage system is determined.

In this error injection way, an error from an underlying storage device may be simulated in a scenario of connecting a computer device with a storage device via a switch and a scenario of connecting a computing device with a PCIe device via a switch, which is advantageous for testing comprehensively error processing of a data storage system on the entire I/O path. In addition, the error injection manner does not require a dedicated error injection tool, and can be easily applied to an appropriate device in a storage system.

Example embodiments of the present disclosure will be described below in detail with reference to the drawings.

Figure 2:
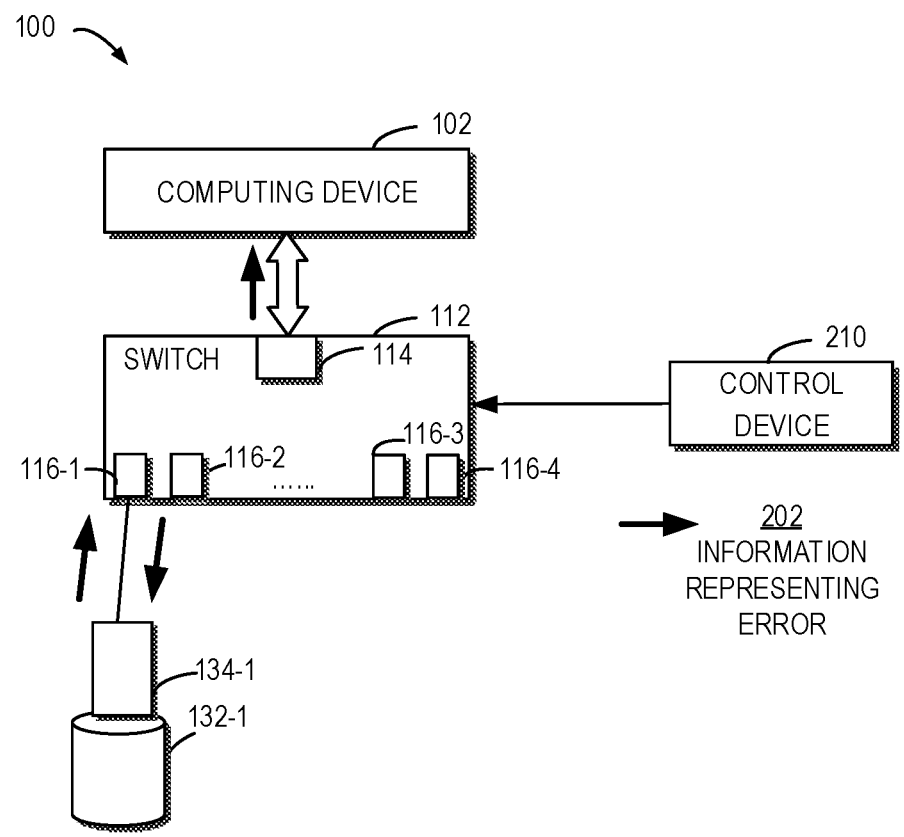
FIG. 2 schematically illustrates a block diagram of an example of the data storage system in an error injection mode in accordance with an embodiment of the present disclosure.

FIG. 2 illustrates a block diagram of a system when a data storage system is in an error injection mode according to some embodiments of the present disclosure. For ease of discussion, reference will be made to the data storage system 100 in FIG. 1 to discuss how to implement error injection of the data storage system. It would be appreciated that the error injection according to the embodiments of the present disclosure may be applied to other storage systems with two or more switches.

In FIG. 2, the data storage system 100 is set to an error injection mode. In the error injection mode, a control device 210 is configured to inject information 202 representing an error of the storage device 132 to the data storage system 100. As an error injection control device, the control device 202 may be independent of the data storage system 100. The control device 202 may be any computing device. The information 202 representing an error of the storage device 132 may indicate an error occurring probably in the storage device 132.

In some embodiments, the information 202 representing an error may be in the form of data packet passted in the data storage system 100, and the data packet contains an error which, for example, may be caused by an internal failure of the storage device (for example, a storage data error) or a wrong link of the storage device (for example, a wrong Transaction Layer Packet (TLP)).

Furthermore, in some embodiments, the information 202 representing an error may be a PCIe correctable error which can be identified and corrected automatically by hardware. It would be appreciated that the information 202 representing an error may represent any possible error generated in an array of storage devices when testing the error handling capability of the data storage system 100. The information 202 representing an error may be pre-designed, for example, generated by testing personnel according to the testing requirement.

According to embodiments of the present disclosure, as shown in FIG. 2, the information 202 representing an error is injected into the switch 112. The control device 210 may be connected to the switch 112 when it is required to perform error injection. The connection between the control device 210 and the switch 112 may be any connection supporting communication therebetween. In some embodiments, the control device 210 may be connected to the switch 112 via a Universal Asynchronous Receiver/Passter (UART) interface (sometimes referred to as serial port) or an Ethernet cable, to inject the information 202 representing the error into the switch 112.

In order to enable the information 202 representing the error to be passted to the computing device 104, the downstream port and the upstream port 114 of the switch 112 are connected, according to the embodiments of the present disclosure. In the example of FIG. 2, for illustration, the downstream port 116-1 and the upstream port 114 of the switch 112 are connected as shown by way of example. In a normal operation, the downstream port 116-1 and the upstream port 114 are connected to the storage device 132-1 and the computing device 104, respectively, but not interconnected with each other. However, the two downstream ports are connected in the error injection mode. It may be implemented by short-connecting the switch card 134-1 of the storage device 132-1 to the link of the upstream port 114, for example.

In some embodiments, in the scenario of the error injection as shown in FIG. 2, the downstream port 116-1, for example, may be a U.2 connector, and the upstream port 114, for example, may be a U.2 connector as well.

In some embodiments, when injecting the information 202 representing an error, the control device 210 may inject the information 202 representing the error to the downstream port 116-1. As the downstream port 116-1 is connected to the upstream port 114, the information 202 representing the error may be passted via the internal exchange structure of the switch 122 to the upstream port 114, and thus received by the computing device 104. The solid arrows in FIG. 2 indicate a transmission path of the information 202 representing the error.

Via the port connection of the switch, as seen from the computing device 104, the error information 202 is regarded as being received via a full computing device-switch-storage device I/O path. It simulates a complete transmission route of the error generated by the storage device. In the storage system, the computing system 104 may perform respective acts to process the information 202 representing the error, depending on its capability. By simulating an error from a storage device, full logic for processing an error may be tested better in the data storage system 100 when the error occurs.

In some embodiments, for the purpose of error injection and detection, the computing device 104 may be configured to perform the I/O operation of the storage device 132-1 connected to the downstream port 116-1, to pass the information 202 representing the error to the computing device 104. In this way, the error handling capability when running the I/O operation in the data data storage system 100 can be simulated better. Such configuration may be implemented by sending a control indication of a related configuration from the control device 210 to the computing device 104, or directly configuring the computing device 104.

In some embodiments, a user may specify how the information 202 representing the error is injected. For example, the user may specify a storage device to be tested via the control device 210 or in other manners, and thus specify an I/O path from the storage device to the computing device 104. The user may specify the I/O path to be tested by manually connecting the downstream port with the upstream port. In this way, as compared to the error injection using a dedicated instrument, the solution can implement a more flexible customized error injection.

In some embodiments, the type of the information 202 representing an error may be specified by a user. For example, in the scenario as shown in FIG. 2, the information 202 representing an error may be information representing an error of the storage device 132 as mentioned above, or may be information representing a PCIe bus error, such as a PCIe correctable error as aforementioned.

In order to monitor the result of the error injection, the control device 210 may obtain a handling result of the computing device 104 on the injected information representing an error, to determine the error handling capability of the data storage system 100. The handling result may indicate whether the computing device 104 has a capability of correctly detecting an error and/or correcting the error. In some embodiments, if it is determined that the information 202 representing the error is not detected or not corrected correctly, an alarm may be provided, to promote an improvement on the error handling capability of the data data storage system 100.

Although FIG. 2 shows a test on an error probably occurring in the storage device 132, it would be appreciated that the error injection test may be applied to other devices in the data storage system 100. When error injection and testing are performed for different tested devices, the types of the upstream port and the downstream port of the switch 112 may differ from each other.

Figure 3:
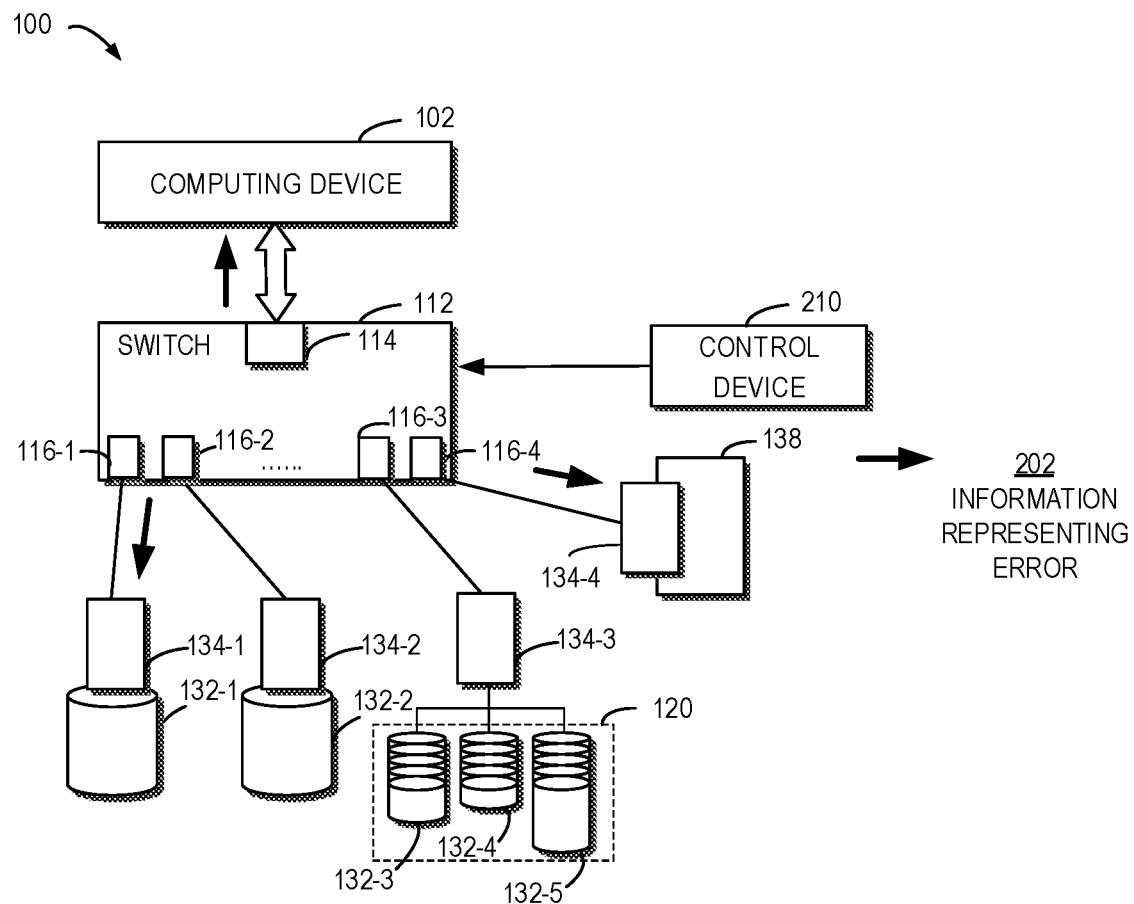
FIG. 3 schematically illustrates a block diagram of a further example of the data storage system in an error injection mode in accordance with an embodiment of the present disclosure.

FIG. 3 schematically illustrates a block diagram of a further example of a storage system in an error injection mode according to embodiments of the present disclosure.

Similarly in the scenario as shown in FIG. 2, the control device 210 injects information 202 representing an error to the switch 112. In order to enable the information 202 representing the error to be passted to the computing device 104, the downstream port 116-1 and the upstream port 114 of the switch 112 are connected.

The difference from FIG. 2 lies in that the injected information 202 representing an error is information representing an error probably occurring in PCIe HBA 138. When injecting the information 202 representing an error, the control device 210 may inject the information 202 representing an error to the downstream port 116-1. For example, the downstream port 116-1 may be connected to the downstream port 116-4, and the error information 202 therefore may be passted via the internal exchange structure of the switch 122 to the downstream port 116-4 and further to the upstream port 114, thus being received by the computing device 104. The solid arrows in FIG. 3 represent the transmission path of the information 202 representing an error.

In the scenario of error injection as shown in FIG. 2, the downstream port 116-1, for example, may be a U.2 connector, the downstream port 116-1, for example, may be a PCIe extension, and the upstream port 114, for example, may be a PCIe gold finger.

It would be appreciated that, for different devices to be tested, the control device 210 can inject different types of information representing respective errors. The connection of the device to be tested and the computing device for processing an error with the switch may be achieved via multiple different upstream/downstream ports. Multiple possible application modes of upstream/downstream ports are listed below.

TABLE 1

Application Modes of Upstream/Downstream Ports

| No. | Upstream | Downstream | Brief Description |
| --- | --- | --- | --- |
| 1 | PCIe gold finger | PCIe extension slot | error injection between server motherboard and PCIe device |
| 2 | PCIe gold finger | U.2 female | error injection between server motherboard and U.2 disk |
| 3 | PCIe gold finger | M.2 female | error injection between server motherboard and M.2 disk |
| 4 | PCIe gold finger | MINISAS HD | error injection between server motherboard and JBOF |
| 5 | MINISAS HD | U.2 female | error injection between MINISAS HD connector and U.2 disk |

TABLE 1-continued

Application Modes of Upstream/Downstream Ports

| No. | Upstream | Downstream | Brief Description |
|---|---|---|---|
| 6 | MINISAS HD | M.2 female | error injection between MINISAS HD connector and M.2 disk |
| 7 | MINISAS HD | MINISAS HD | error injection between MINISAS HD connector and JBOF disk |
| 8 | MINISAS HD | PCIe extension slot | error injection between MINISAS HD connector and PCIe device |
| 9 | U.2 male | U.2 female | error injection between U.2 disk and U.2 disk |
| 10 | M.2 male | M.2 female | error injection between M.2 disk and M.2 disk |

Figure 4:
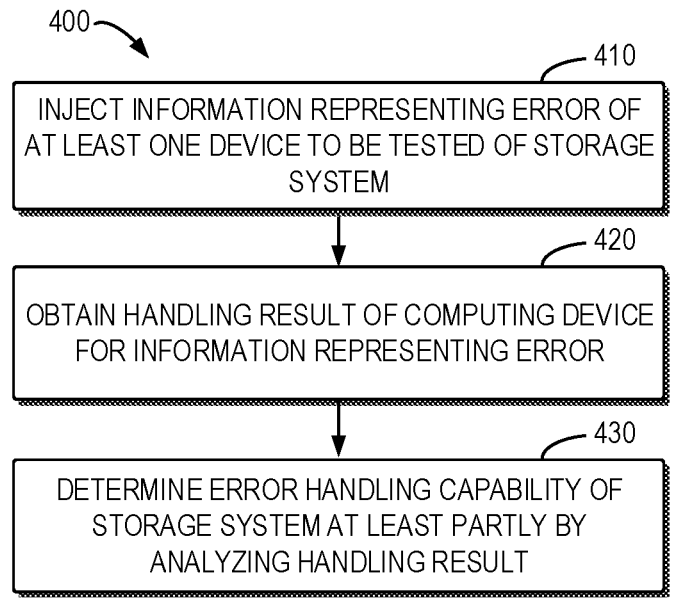
FIG. 4 illustrates a flowchart of a method of error detection in accordance with an embodiment of the present disclosure.

FIG. 4 illustrates a flowchart of a method 400 of error injection according to some embodiments of the present disclosure. The method 400 may be implemented at the control device 210 in FIG. 2. For illustration, the method 400 will be described with reference to FIG. 2.

At block 410, the control device 210 injects, to the switch of the storage system, information representing an error of at least one device to be tested of the storage system, such that the information representing the error is passed from the upstream port of the switch to the computing device connected with the switch, and the switch is connected to the at least one device to be tested via the downstream port. At block 420, the control device 210 obtains a handling result of the computing device on the information representing the error. At block 430, the control device 210 determines an error handling capability of the storage system at least partly by analyzing the handling result.

In some embodiments, injecting the information representing the error includes: injecting the information representing the error at the downstream port; and causing the computing device to perform an I/O operation of the storage device connected to the downstream port in the storage system, to pass the information representing the error to the computing device.

In some embodiments, the information is injected in response to a user input.

In some embodiments, the switch is a Peripheral Component Interconnect express (PCIe) switch.

In some embodiments, at least one device to be tested includes at least one of the storage devices of the storage system, the Peripheral Component Interconnect express (PCIe) device, the U.2 connector, the M.2 connector and MINISAS HD.

In the error injecting way as described above with reference to FIGS. 2-4, slave storage devices of system nodes in the storage system, the connectors, and the whole PCIe topology at the CPU level can be tested, and the testing therefore can be performed over the full logic path for error processing. The solution can save the testing costs when improving the system performance.

Figure 5:
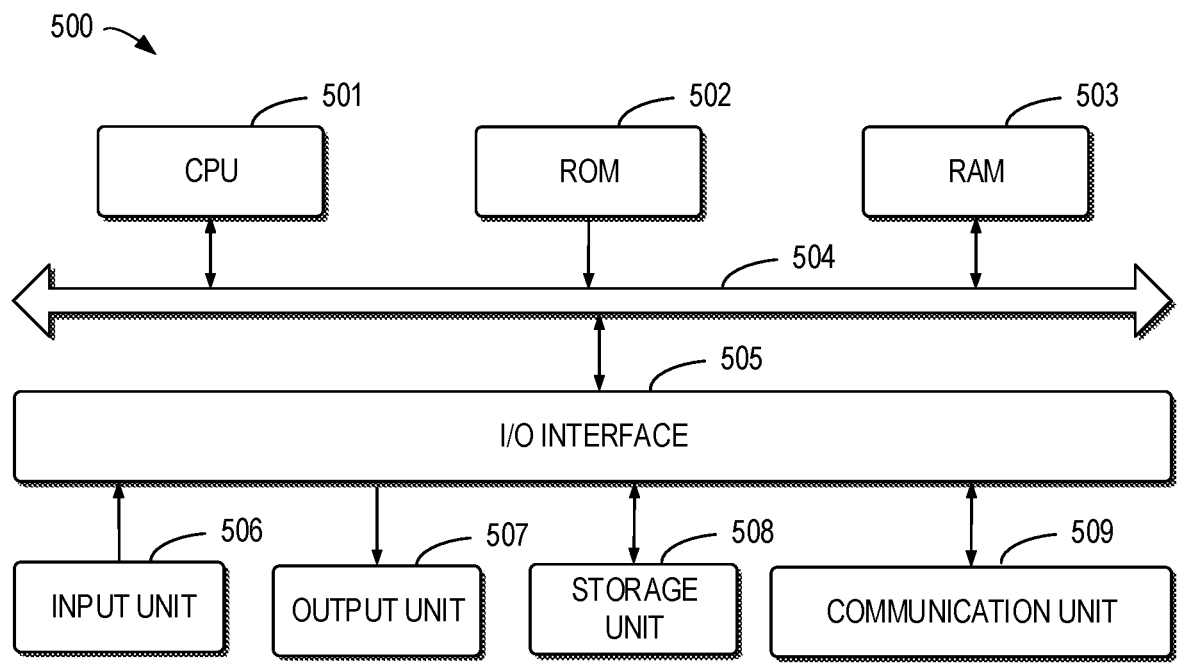
FIG. 5 illustrates a block diagram of an example device suitable for implementing embodiments of the present disclosure.

FIG. 5 illustrates a block diagram of an example device 500 that may be used to implement embodiments of the present disclosure. The device 500 may be implemented as or covered in the computing device 102 or control device 210 in FIG. 2.

As shown, the device 500 includes a central processing unit (CPU) 501 which performs various appropriate acts and processing, based on a computer program instruction stored in a read-only memory (ROM) 502 or a computer program instruction loaded from a storage unit 508 to a random access memory (RAM) 503. The RAM 503 stores therein various programs and data required for operations of the device 500. The CPU 501, the ROM 502 and the RAM 503 are connected via a bus 504 with one another. An input/output (I/O) interface 505 is also connected to the bus 504.

The following components in the device 500 are connected to the I/O interface 505: an input unit 506 such as a keyboard, a mouse and the like; an output unit 507 including various kinds of displays and a loudspeaker, etc.; a storage unit 508 including a magnetic disk, an optical disk, and the like; a communication unit 509 including a network card, a modem, a wireless communication transceiver, and the like. The communication unit 509 allows the device 500 to exchange information/data with other devices through a computer network such as the Internet and/or various kinds of telecommunications networks.

Various processes and processing described above, e.g., the method 400, may be executed by the processing unit 501. For example, in some embodiments, the method 400 may be implemented as a computer software program that is tangibly included in a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the method 400 as described above may be executed. Alternatively, in other embodiments, the CPU 501 may be configured to execute the method 400 in any other appropriate manner (for example, by means of firmware).

It is to be understood by those skilled in the art that various steps of the method according to the present disclosure may be implemented via a general purpose computing device, which may be integrated on a single computing device or distributed over a network composed of a plurality of computing devices. Optionally, they may be implemented using program code executable by the computing device, such that they can be stored in a storage device and executed by the computing device; or they may be made into respective integrated circuit modules, or a plurality of modules or steps therein may be made into a single integrated circuit module for implementation. In this way, the present disclosure is not limited to any specific combination of hardware and software.

It would be appreciated that, although several means or sub-means (e.g., circuitry) of the device have been mentioned in the description above, such partition is provided only as an example, without limitation. According to the embodiments of the present disclosure, features and functions of two or more apparatuses described above may be instantiated in one apparatus, in practice. In turn, features and functions of one apparatus described above may be further partitioned to be instantiated by various apparatuses.

What have been mentioned above are merely some optional embodiments of the present disclosure, without suggesting limitation to the present disclosure. For those skilled in the art, the present disclosure may allow various alternations and changes. Any modifications, equivalents and improvements made within the spirits and principles of the present disclosure should be covered within the scope of the present disclosure.

It should be appreciated that U.2 may refer to the SFF-8639 computer interface standard for connecting SSDs to a computer. Additionally, it should be appreciated that M.2 may refer to the Next Generation Form Factor (NGFF) specification for computer expansion cards.

We claim:

1. A method of error detection, comprising:
   injecting, to a switch of a storage system, information representing an error of at least one device to be tested of the storage system, so that the information representing the error is passed from an upstream port of the switch to a computing device connected with the switch, the switch being connected to the at least one device to be tested via a downstream port;
   obtaining a handling result of the computing device for the information representing the error; and
   determining an error handling capability of the storage system at least partly by analyzing the handling result;
   wherein the information is injected in response to a user input.

2. The method of claim 1, wherein injecting the information representing the error comprises:
   injecting the information representing the error at the downstream port; and
   causing the computing device to perform an I/O operation for a storage device in the storage system that is connected with the downstream port, to pass the information representing the error to the computing device.

3. The method of claim 1, wherein the switch is a Peripheral Component Interconnect express (PCIe) switch.

4. The method of claim 1, wherein the at least one device to be tested comprises at least one of the following:
   a storage device of a storage system,
   a Peripheral Component Interconnect express (PCIe) device,
   U.2 connector,
   M.2 connector, and
   Mini Serial Attached Small Computer System Interface High Density Interconnect (MINISAS HD).

5. The method of claim 1, wherein the error may comprise at least one of the following;
   a Peripheral Component Interconnect express (PCIe) correctable error; and
   a medium error of a storage device of a storage system.

6. The method of claim 1, wherein the upstream port and the downstream port are connected in an error injection mode.

7. The method of claim 1, wherein injecting the information representing the error comprises:
   providing a data packet which indicates an internal failure of a storage device.

8. The method of claim 1, wherein injecting the information representing the error comprises:
   providing a data packet which indicates an incorrect link of a storage device.

9. An electronic device, comprising:
   a processor; and
   a memory coupled to the processor and storing instructions for execution, the instructions, when executed by the processor, causing the electronic device to perform acts comprising:
   injecting, to a switch of a storage system, information representing an error of at least one device to be tested of the storage system, such so that the information representing the error is passed from an upstream port of the switch to a computing device connected with the switch, the switch being connected to the at least one device to be tested via a downstream port;
   obtaining a handling result of the computing device for the information representing the error; and
   determining an error handling capability of the storage system at least partly by analyzing the handling result;
   wherein the information is injected in response to a user input.

10. The electronic device of claim 9, wherein injecting the information representing the error comprises:
    injecting the information representing the error at the downstream port; and
    causing the computing device to perform an I/O operation for a storage device in the storage system that is connected with the downstream port, to pass the information representing the error to the computing device.

11. The electronic device of claim 9, wherein the switch is a Peripheral Component Interconnect express (PCIe) switch.

12. The electronic device of claim 9, wherein the at least one device to be tested comprises at least one of the following:
    a storage device of a storage system,
    a Peripheral Component Interconnect express (PCIe) device,
    U.2 connector,
    M.2 connector, and
    Mini Serial Attached Small Computer System Interface High Density Interconnect (MINISAS HD).

13. The electronic device of claim 9, wherein the error may comprise at least one of the following;
    a Peripheral Component Interconnect express (PCIe) correctable error; and
    a medium error of a storage device of a storage system.

14. The electronic device of claim 9, wherein the upstream port and the downstream port are connected in an error injection mode.

15. The electronic device of claim 9, wherein injecting the information representing the error comprises:
    providing a data packet which indicates an internal failure of a storage device.

16. The electronic device of claim 9, wherein injecting the information representing the error comprises:
    providing a data packet which indicates an incorrect link of a storage device.

17. A computer program product having a non-transitory computer readable medium which stores a set of instructions to perform error detection; the set of instructions, when carried out by computerized circuitry, causing the computerized circuitry to perform a method of:
    injecting, to a switch of a storage system, information representing an error of at least one device to be tested of the storage system, so that the information representing the error is passed from an upstream port of the switch to a computing device connected with the switch, the switch being connected to the at least one device to be tested via a downstream port;
    obtaining a handling result of the computing device for the information representing the error; and
    determining an error handling capability of the storage system at least partly by analyzing the handling result;
    wherein the information is injected in response to a user input.

18. The computer program product of claim 17, wherein injecting the information representing the error comprises:
    injecting the information representing the error at the downstream port; and
    causing the computing device to perform an I/O operation for a storage device in the storage system that is connected with the downstream port, to pass the information representing the error to the computing device.

19. The computer program product of claim 17, wherein the switch is a Peripheral Component Interconnect express (PCIe) switch.

20. The computer program product of claim 17, wherein the at least one device to be tested comprises at least one of the following:
- a storage device of a storage system,
- a Peripheral Component Interconnect express (PCIe) device,
- U.2 connector,
- M.2 connector, and
- Mini Serial Attached Small Computer System Interface High Density Interconnect (MINISAS HD).

* * * * *